(12) United States Patent
Novak et al.

(10) Patent No.: US 7,434,170 B2
(45) Date of Patent: Oct. 7, 2008

(54) DRAG AND DROP METADATA EDITING

(75) Inventors: Michael Novak, Redmond, WA (US);
Daniel Plastina, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 777 days.

(21) Appl. No.: 10/616,159

(22) Filed: Jul. 9, 2003

(65) Prior Publication Data

US 2005/0010589 A1 Jan. 13, 2005

(51) Int. Cl.
*G06F 3/00* (2006.01)
(52) U.S. Cl. .................. 715/764; 715/829; 715/830; 715/833; 715/826; 715/866
(58) Field of Classification Search ............ 715/769, 715/770, 853–855, 764, 829, 830, 833, 826, 715/866
See application file for complete search history.

(56) References Cited

U.S. PATENT DOCUMENTS

| | | | |
|---|---|---|---|
| 5,410,698 A | | 4/1995 | Danneels et al. |
| 5,793,980 A | | 8/1998 | Glaser et al. |
| 5,821,937 A | * | 10/1998 | Tonelli et al. ............... 715/853 |
| 5,832,495 A | * | 11/1998 | Gustman ................... 707/102 |
| 5,848,424 A | * | 12/1998 | Scheinkman et al. ..... 715/501.1 |
| 6,014,135 A | | 1/2000 | Fernandes |
| 6,230,207 B1 | | 5/2001 | Roberts et al. |
| 6,407,753 B1 | | 6/2002 | Budinsky et al. |
| 6,452,609 B1 | | 9/2002 | Katinsky et al. |
| 6,463,445 B1 | | 10/2002 | Suzuki et al. |
| 6,505,160 B1 | | 1/2003 | Levy et al. |
| 6,760,721 B1 | * | 7/2004 | Chasen et al. .................. 707/3 |
| 6,829,368 B2 | | 12/2004 | Meyer et al. |
| 6,973,451 B2 | | 12/2005 | Laronne et al. |
| 7,047,241 B1 | * | 5/2006 | Erickson ...................... 707/9 |
| 7,062,502 B1 | * | 6/2006 | Kesler ....................... 707/102 |
| 7,149,983 B1 | * | 12/2006 | Robertson et al. ........... 715/810 |

(Continued)

FOREIGN PATENT DOCUMENTS

EP           01189437  A2        3/2002

(Continued)

OTHER PUBLICATIONS

MusicMatch, MusicMatch Jukebox User's Guide, Feb. 07, 2003, Chapters A1-A6 & 1-9.

(Continued)

*Primary Examiner*—Dennis-Doon Chow
*Assistant Examiner*—Michael Roswell
(74) *Attorney, Agent, or Firm*—Senniger Powers LLP

(57) ABSTRACT

A method and system for modifying metadata of one or more media files via a drag and drop operation. A media library stores one or more media files. A graphical user interface displays the one or more media files in the media library via a display. The graphical user interface allows a user to select one or more media files from the media files being displayed. The user interface allows a user to drag and drop the one or more selected media files onto a property node that defines a property the user would like to incorporate into the metadata of one or more selected media files. Dropping the one or more selected media files onto the property node modifies the metadata of the media file to correspond to the property defined by the property onto which the one or more selected media files were dropped.

50 Claims, 9 Drawing Sheets

U.S. PATENT DOCUMENTS

| | | | |
|---|---|---|---|
| 2001/0031066 A1 | 10/2001 | Meyer et al. | |
| 2002/0001395 A1 | 1/2002 | Davis et al. | |
| 2002/0033844 A1 | 3/2002 | Levy et al. | |
| 2002/0055951 A1 | 5/2002 | Shigetomi et al. | |
| 2002/0059370 A1 | 5/2002 | Shuster | |
| 2002/0069218 A1 | 6/2002 | Sull et al. | |
| 2002/0099737 A1 | 7/2002 | Porter et al. | |
| 2002/0103920 A1 | 8/2002 | Berkun et al. | |
| 2002/0143976 A1 | 10/2002 | Barker et al. | |
| 2002/0157095 A1 | 10/2002 | Masumitsu et al. | |
| 2002/0178276 A1 | 11/2002 | McCartney et al. | |
| 2002/0184180 A1 | 12/2002 | Debique et al. | |
| 2002/0193895 A1* | 12/2002 | Qian et al. | 700/94 |
| 2003/0009469 A1* | 1/2003 | Platt et al. | 707/100 |
| 2003/0036948 A1 | 2/2003 | Woodward et al. | |
| 2003/0135513 A1 | 7/2003 | Quinn et al. | |
| 2003/0174861 A1 | 9/2003 | Levy et al. | |
| 2003/0236582 A1 | 12/2003 | Zamir et al. | |
| 2004/0006575 A1 | 1/2004 | Visharam et al. | |
| 2004/0017997 A1 | 1/2004 | Cowgill | |
| 2004/0125144 A1* | 7/2004 | Yoon | 345/769 |
| 2004/0143590 A1* | 7/2004 | Wong et al. | 707/102 |
| 2004/0143598 A1* | 7/2004 | Drucker et al. | 707/104.1 |
| 2004/0143604 A1* | 7/2004 | Glenner et al. | 707/200 |
| 2004/0172593 A1 | 9/2004 | Wong et al. | |
| 2004/0175159 A1 | 9/2004 | Oetzel et al. | |
| 2004/0177319 A1* | 9/2004 | Horn | 715/501.1 |
| 2004/0267893 A1 | 12/2004 | Lowe et al. | |
| 2005/0091268 A1 | 4/2005 | Meyer et al. | |
| 2005/0234958 A1 | 10/2005 | Sipusic et al. | |
| 2007/0192872 A1 | 8/2007 | Rhoads et al. | |

OTHER PUBLICATIONS

Edward Swierk, et al., The Roma Personal Metadata Service, Mobile Networks and Applications vol. 7, pp. 407-418, 2002.

Field et al., "Personal DJ, an Architecture for Personalised Content Delivery," Proceedings of the Tenth International Conference on World Wide Web, 2001, pp. 1-7, ACM Press, New York, U.S.A.

Bainbridge et al., "Towards a Digital Library of Popular Music," Proceedings of the Fourth ACM Conference on Digital Libraries, 1999, pp. 161-169, ACM Press, New York, U.S.A.

Minibayeva et al., "A Digital Library Data Model for Music," Proceedings of the Second ACM/IEEE-CS Joint Conference on Digital Libraries, 2002, pp. 154-155, ACM Press, New York, U.S.A.

Pampalk et al., Proceedings of the 2002 ACM Workshops on Multimedia, 2002, pp. 570-579, ACM Press, New York, U.S.A.

Scott et al., "Abstracting Application-level Web Security," Proceedings of the Eleventh International Conference on World Wide Web, 2002, pp. 396-407, ACM Press, New York, U.S.A.

* cited by examiner

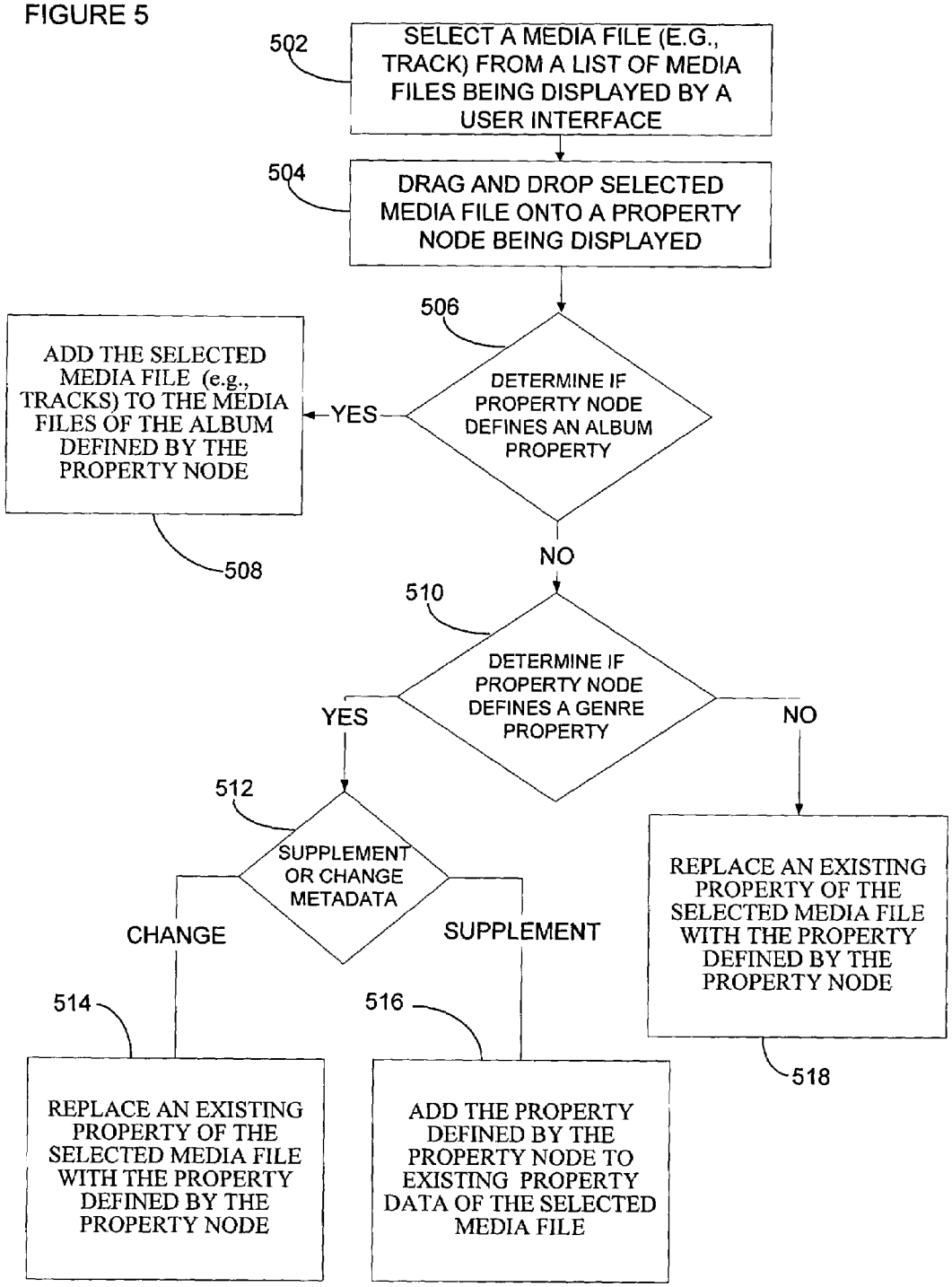

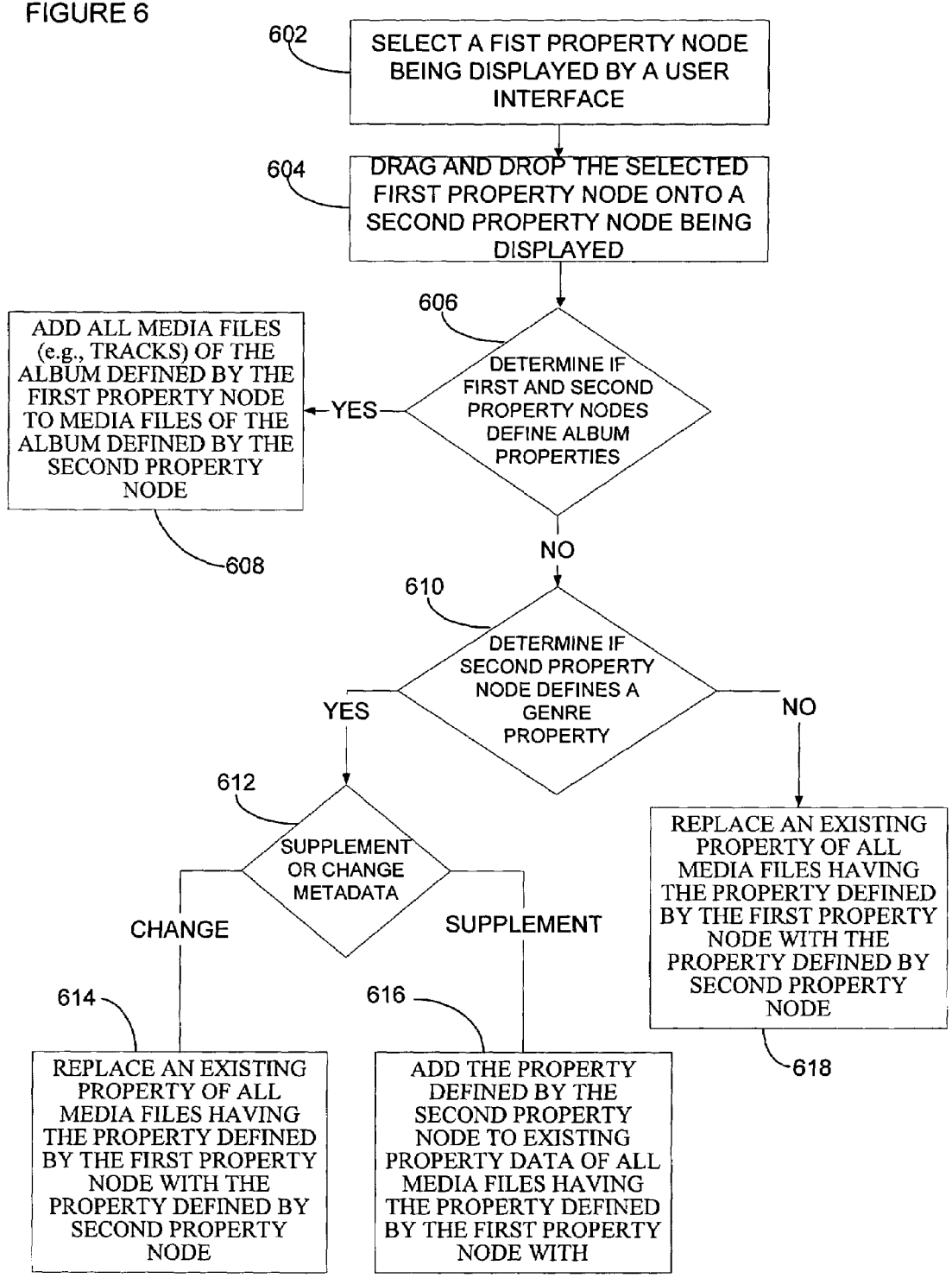

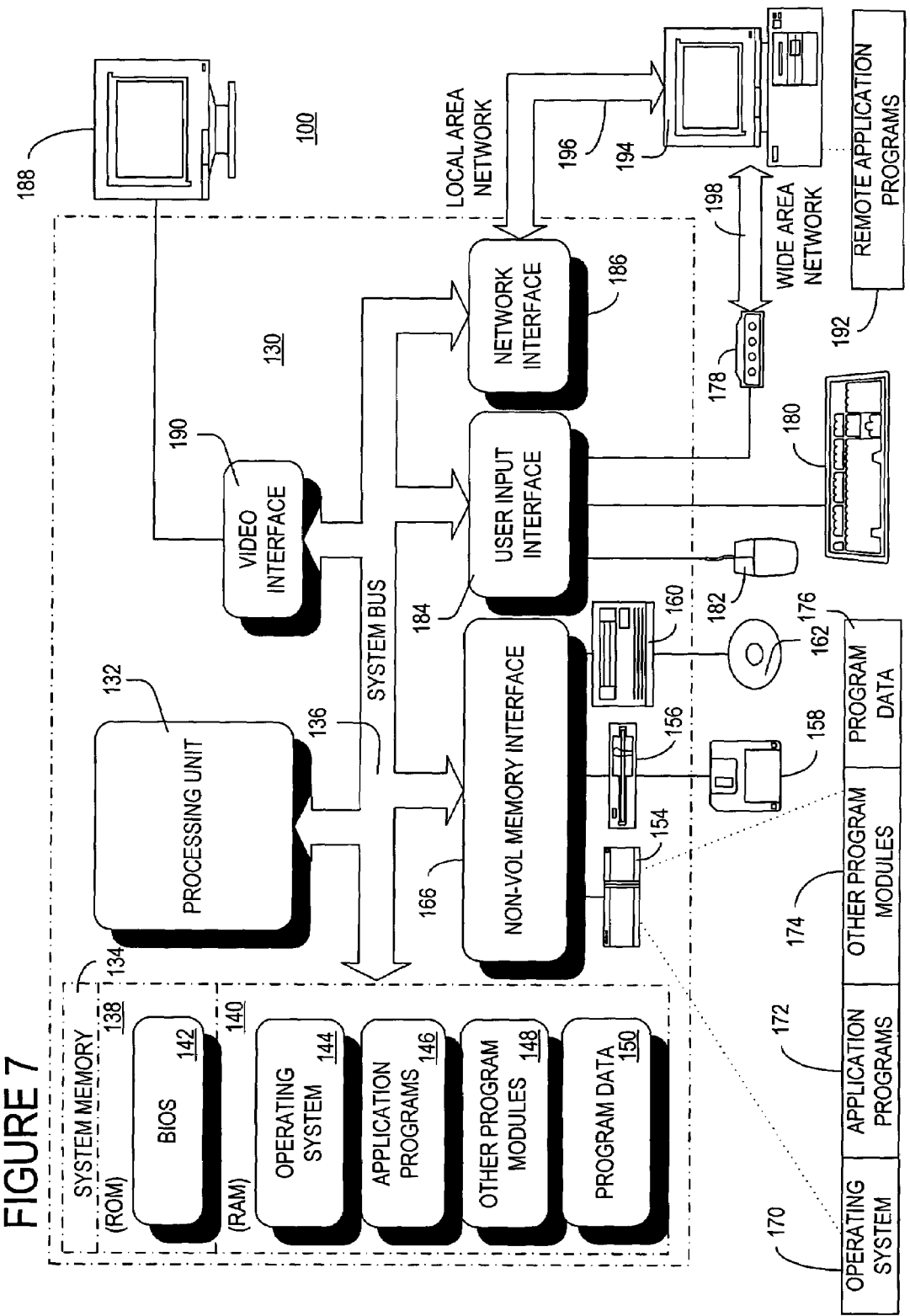

DRAG AND DROP METADATA EDITING

TECHNICAL FIELD

The present invention relates to the field of processing digital media content. In particular, this invention relates to an improved system and method for editing metadata within digital media files to enhance user experience.

BACKGROUND OF THE INVENTION

Due to recent advances in technology, computer users are now able to enjoy many features that provide an improved user experience, such as playing various media and multimedia content on their personal or laptop computers. For example, most computers today are able to play compact discs (CDs) so users can listen to their favorite musical artists while working on their computers. Additionally, many computers are equipped with digital versatile disc (DVD) drives enabling users to watch movies.

As users become more familiar with advanced features on their computers, such as those mentioned above, their expectations of the various additional innovative features will undoubtedly continue to grow. For example, consider a media player software application that enables a user to play a CD on his or her computer. Typical applications allow the user to display track information associated with the CD by clicking on an appropriate user interface (UI). Such track information is often referred to as Metadata.

Metadata for digital media such as a music file is general information pertaining to the media file itself. For example, a music file may have the song title, song artist, and album title for the work as metadata tags. Very commonly, files exist that don't have complete metadata in the file header. Frequently, users may want to fill in this missing data, or correct incorrect data or spelling errors. Traditionally, users would be required to edit these entries by hand through the use of an in-place editor or a tag-editing application or dialog. However, this approach can be laborious when the user must correct a large number of file headers.

Accordingly, this invention arose out of concerns for providing improved systems and methods for processing media content that provide an improved, rich, and robust user experience.

SUMMARY OF THE INVENTION

The invention meets the above needs and overcomes one or more deficiencies in the prior art by providing improved user experience when editing metadata associated with various media files. The invention provides a user interface that permits the user to efficiently edit the metadata of one or more media files by performing a drag and drop operation. The invention eliminates the need for a user to manually enter corrections, and/or make redundant corrections. Moreover, the features of the present invention described herein are less laborious and easier to implement than currently available techniques as well as being economically feasible and commercially practical.

In accordance with one aspect of the invention, a method is provided for modifying metadata of a media file in a media library. The media file includes a metadata field that includes property data. The property data defines a property of the media file. The method includes selecting a media file from a list of media files being displayed via a graphical user interface. The method further includes associating the selected media file with property category data within a property category, wherein the property category data defines a different property than the property of the media file. The method also includes modifying the metadata field of the selected media file to correspond to the different property defined by the property category data.

In accordance with another aspect of the invention, a method is provided for modifying metadata of one or more media files in a media library. The method includes selecting property category data within a property category being displayed via graphical user interface. The property category data defines a property of one or more media files. The method further includes associating the selected property category data with different property category data. The different property category data defines a different property than the property of the media file. The method further includes modifying the property data in the metadata field of the one or more media files having the property defined by the property category data to correspond to the different property defined by the different property category data.

In accordance with another aspect of the invention, a computer-readable medium includes computer executable instructions for modifying metadata of a media file in a media library. The media file includes a metadata field that includes property data, and the property data defines a property of the media file. Identifying instructions identify a media file from a list of media files being displayed via a graphical user interface. Associating instructions associate the identified media file with property category data within a property category. The property category data defines a different property than the property of the media file. Modifying instructions modify the metadata field of the identified media file to correspond to the different property defined by the property category data.

In accordance with yet another aspect of the invention, a computer-readable medium includes computer executable instructions for modifying metadata of one or more media files in a media library. Identifying instructions identify property category data within a property category being displayed via graphical user interface. The property category data defines a property of one or more media files to be modified. Associating instructions associate the identified property category data with different property category data. The different property category data defines a different property. Modifying instructions modify the property data in the metadata field of the one or more media files having the property defined by the property category data to correspond to the different property defined by the different property category data.

In accordance with yet another aspect of the invention, a computer system for modifying the metadata of a media file includes a graphical user interface having a display and a user interface selection device provides a method for providing and selecting from a list of media files on the display. The method includes selecting a media file from the list of media files being displayed by the user interface. The media file includes a metadata field defining a property of the media file. The method further includes associating the selected media file with property category data within a property category being displayed by the user interface. The property category data defines a different property than the property of the media file. The computer system is responsive to associating the selected media file with property category data to modify the metadata field of the selected media file to correspond to the different property defined by the property category data.

Alternatively, the invention may comprise various other methods and apparatuses.

Other features will be in part apparent and in part pointed out hereinafter.

BRIEF DESCRIPTION OF THE DRAWINGS

FIG. 5 is an exemplary flow chart illustrating a method of editing a media file according to one embodiment of the invention.

FIG. 6 is an exemplary flow chart illustrating a method of editing a group of media files according to one embodiment of the invention.

FIG. 7 is a block diagram illustrating one example of a suitable computing system environment in which the invention may be implemented.

Corresponding reference characters indicate corresponding parts throughout the drawings.

DETAILED DESCRIPTION OF THE INVENTION

Figure 1:
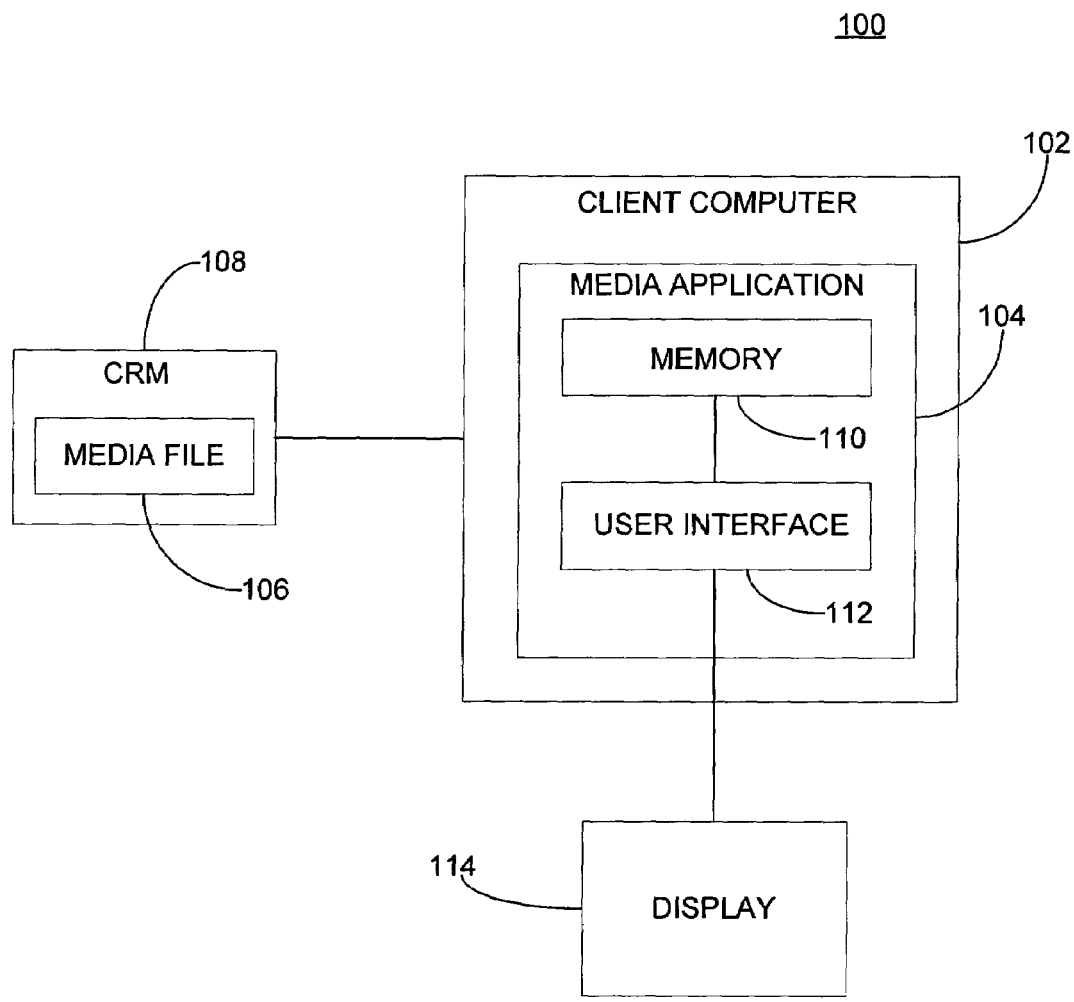
FIG. 1 is an exemplary computer system in which the present invention can be used.

Referring now to the drawings, FIG. 1 illustrates an exemplary computer system 100 in which the present invention can be used. A system 100 includes a client computer 102 that executes a media player application 104. The media player application 104 can be any suitable rendering filter or program that is configured to play digital media so that a user can experience the content embodied on the media. For example, suitable media player applications 104 include a CD media player application and a DVD media player application. Executing the media player application 104, allows the user to access a digital media file 106 on a computer-readable medium (CRM) 108 such as a compact disc, a network server, or any other suitable computer storage media, and enables the user or, particularly, enables media player application 104 to access, retrieve, store, and display for the user, so-called metadata. Those skilled in the art are familiar with metadata, which is simply information about data. In the context of the present invention, metadata involves information related to specific content of digital media file 106 being played via the media player application 104. Basic metadata may include one or more of album title, artist, performer, genre, description of content, and the like. Extended metadata includes cover art, performer biographies, reviews, related performers, where to buy similar items, upcoming concerts, ticket sales, URLs to other related experiences including purchase opportunities, and the like. The media player application 104 includes a memory 110 for storing digital media files 106, and a graphical user interface 112 for displaying media files 106 and organized metadata to the user on a display 114.

In the examples herein, the media content of digital media file 106 refers to a single song track or a collection of tracks such as found on an audio CD. It is to be appreciated and understood that the media content can be embodied on any suitable media, including digital files downloaded to the client computer's memory, and that the specific examples described herein are given to further understanding of the inventive principles. The media content can include, without limitation, specially encoded media content in the form of, for example, an encoded media file 106 such as media content encoded in Microsoft® Windows Media™ format using the Microsoft® Windows Media™ Player program.

The resultant system 100 allows improved management of metadata to enhance user experience when editing a media file 106. More specifically, the present invention permits editing metadata by performing a drag and drop operation. As described in more detail below in reference to FIG. 4A, the invention allows a user to modify the metadata of a single media file 106 by dragging a media file 106 being displayed via the user interface 112, and dropping it onto a metadata property within a metadata category being displayed via the user interface 112. A metadata property defines a specific property within a category of metadata such as genre, album title, artist, or the like. For instance, a specific metadata property for genre may be rock, rap, or country. By dropping the media file 106 onto the specific metadata property, the metadata of the media file is modified to correspond to the metadata property. Moreover, and as described in more detail below in reference to FIG. 4B, the invention allows the user to simultaneously modify metadata of multiple media files 106 that share a specific metadata property. Thus, system 100 provides improved management of metadata by permitting a user to modify the metadata of one or more files 106 without manually entering text or making repetitive edits.

Figure 2:
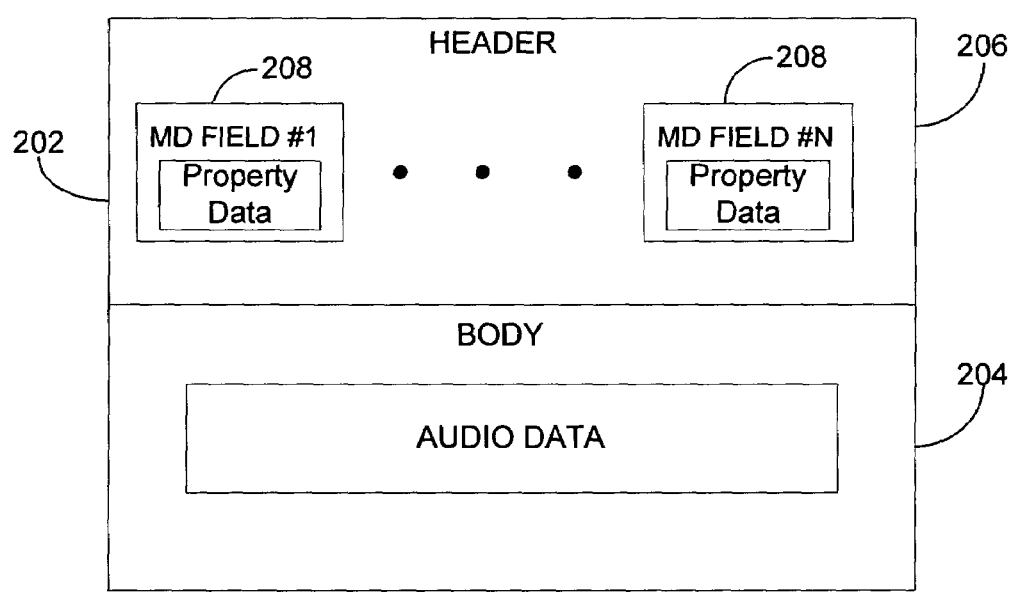
FIG. 2 is an exemplary block diagram illustrating the components of a media file.

Referring next to FIG. 2, the components of an exemplary media file 202 (e.g., media file 106) are shown. In this case, the media file 202 represents a song track such as described above in reference to FIG. 1. The media file 202 includes a body section 204 and a header section 206. The body 206 stores digital audio information that is used by the media player application 104 to play the particular music track. Although the body 204 is described herein as storing digital audio information, it is contemplated that the body 204 of a media file 202 may include digital video information. The header 206 stores digital information, which is used by the media player application 104 to display information (i.e., metadata) about the particular music track. For example, the header 206 may include track information such as the song title, song artist, and album title for the work as stored metadata. The header 206 includes a plurality of metadata fields 208 that each store property data for a particular category of metadata. Property data defines a particular property that the media file 202 has within the particular metadata category. For instance, metadata field #1 may store information related to a genre category, and may have a property that indicates the genre is "Rock," or may have property that indicates the genre is both "Rock" and "Ballad."

Figure 3:
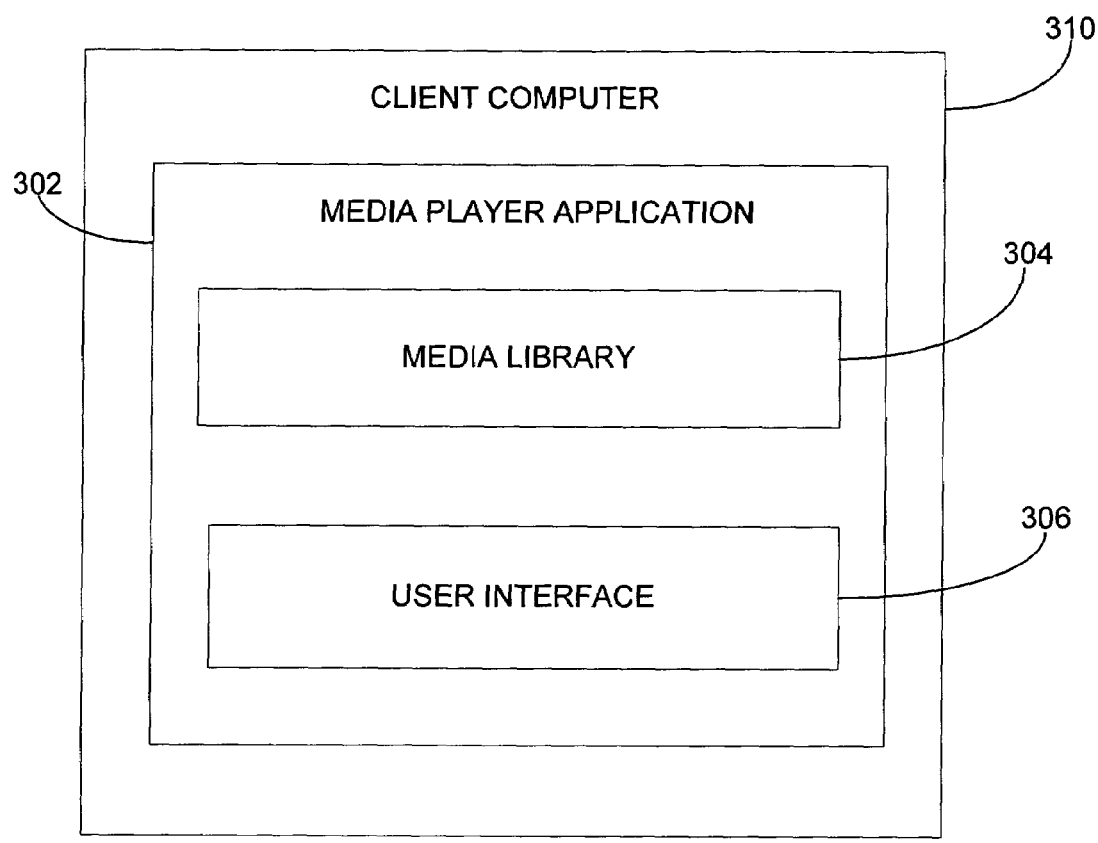
FIG. 3 is an exemplary block diagram illustrating components of a media player application according to one embodiment of the invention.

Referring next to FIG. 3, an exemplary block diagram illustrates basic components of a media player application 302 (e.g., media player application 104) having computer executable instructions for storing, displaying, and editing media files (e.g., media files) according to one embodiment of the invention. The media player application 302 includes a media library 304 (e.g., memory 110) for storing media files 304, and a user interface (UI) 306 for displaying and allowing a user to interact with media files 304. In this embodiment, a client computer 310 (e.g., computer 102) stores and executes the media player application 302. Upon execution, the media player application 302 identifies all media files on the computer 310 it can process, and transfers the identified files to the media library 304. If the media player application 302 is running when the user copies audio files from a CD, the Internet, or other source, the audio files are automatically directed to the media library 304 for storage. The UI 306 displays the data in the media library 304, and allows the user to view and/or edit the stored data.

Figure 3A:
FIG. 3A is a screen shot of a graphical user interface provided by the media player application.

Referring now to FIG. 3A, a screen shot illustrates an exemplary UI 308 for displaying and manipulating media files 304 stored within the media library 306 of Windows Media® Player offered by Microsoft,Cornoration. The UI 308 displays a list of media files 304 in a media file data section 310, and displays category nodes 312 and property nodes 314 in an indexing section 316. Each category node 312 corresponds to a particular property category such as artist, album title, or genre. Each property node 314 defines a specific metadata property within a property category. For example, property nodes labeled "Rap" and "Rock" define a rap genre and a rock genre. The user interacts with data being displayed via the UI 308 by using commonly known navigation techniques. For example, the user can use a mouse linked to the computer to navigate through the UI 308, and to select media files 304, category nodes 312 and or property nodes 314. Selecting a particular category node or property node 314, affects the list media files displayed in the media file data section 310. As shown in the screen shot, selecting the property node labeled "Rock," results in the UI displaying all media files from the media library that have the metadata property "Rock" in the media file data section 310. The UI 308 of the invention allows a user to edit a single media file or a group of media files by performing a drag and drop operation. As known to those skilled in the art, a drag and drop operation refers to a user's ability to perform operations in a graphical user interface by dragging objects on a screen with a mouse from a first location to a second location.

Figure 4A:
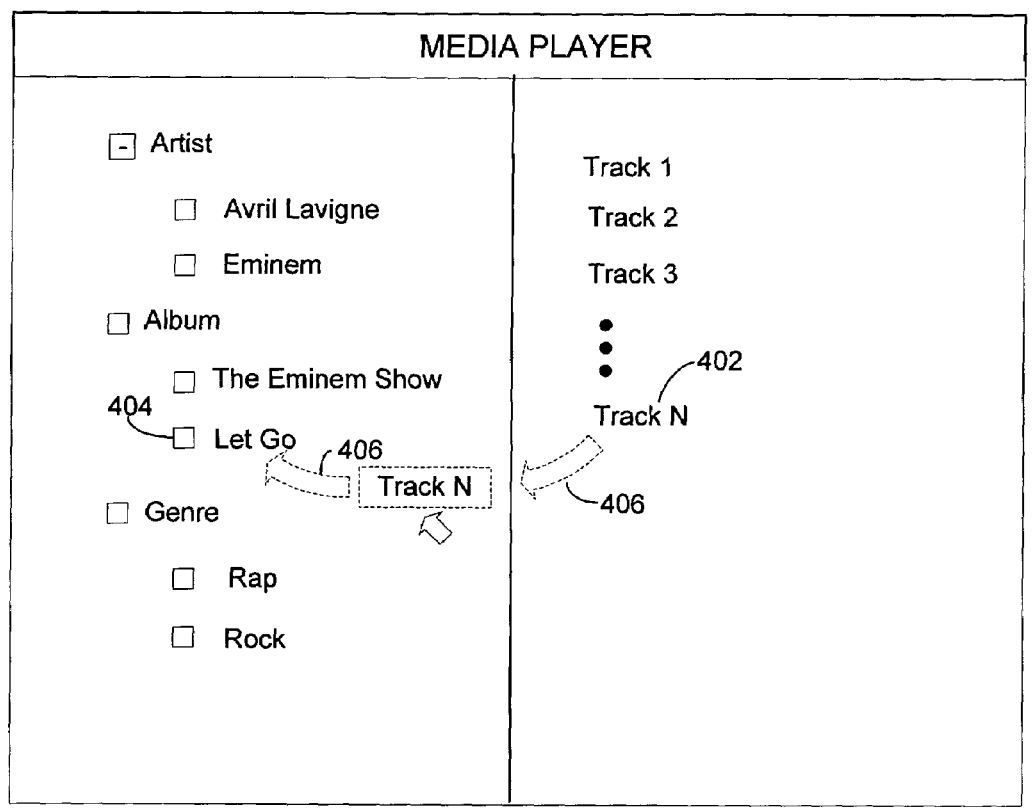
FIG. 4A is an exemplary user interface illustrating a drag and drop operation for editing a media file according to one embodiment of the invention.

Referring now to FIG. 4A, an exemplary user interface 400 illustrates a drag and drop operation for editing a track 402 (e.g., media file 202) according to the invention. The user selects a particular track 402 entitled to edit and drags the selected track 402 to a particular property node 404 which defines a property the user would like to incorporate into the metadata of the selected track 402. For example, by dragging and dropping ("dropping") Track N onto the property node 404 entitled "Let Go", as indicated by reference character 406, the media player application allows a user to modify existing property data within a metadata field 208 (see FIG. 2) of Track N to correspond to the Let Go property defined by the Let Go property node 404. Modifying existing property data includes replacing an existing property defined in the metadata field of the selected track 402 with the property defined by the particular property node 404. Alternatively, modifying the existing property includes supplementing existing property data in the metadata field of the selected track 402 with the property defined by the property node 404. For example, the user can supplement property data of a track 402 indicating that the genre of the media file 402 is "Rap" to indicate that the genre of the media file is "Rock" and "Rap." Whether the property data within the media file 402 is changed (i.e., replaced) or supplemented can depend on the property node onto which the media file is dropped.

In one embodiment, when track 402 is dropped onto property node 404, the media player application provides the user an option to change or supplement an existing property of track 402. Supplementing involves adding the property defined by the property node 404, on which the track is dropped, to the metadata of the selected track 402. Changing a property involves replacing an existing property of the selected track 402 to the property defined by the property node 404. For example, the screen shot shown in FIG. 3A illustrates the media player application's response after the track from the right entitled "Without Me" by Eminem is dragged to the property node entitled "Rock." As can be seen, a context menu 318 appears, and provides the user the option to "Change Genre" (i.e., replace the content's original "Rap" genre with "Rock") or to "Add Genre" (i.e., supplement the original "Rap" genre with "Rock") allowing the track to be represented in both "Rap" and "Rock" indexes.

In another embodiment, referring again to FIG. 4A, dropping track 402 onto property node 404 "Let Go" automatically replaces an existing property of the media file with the property defined by the particular property node. In such an embodiment, dropping Track N onto the property node "Let Go" automatically changes the album title of Track N to "Let Go." As a further example, dropping Track N onto an artist property node such as the Eminem property node replaces the existing artist of Track N file with the artist Eminem.

In yet another embodiment, dropping a particualr track onto a particular property node not only changes a single property of the media file 402, but also requires changing and/or deleting additional properties. For example, dropping a media file 402 onto an album property node will not only change the existing album property of the media file 402, but multiple properties associated with the album property are copied, and some properties associated with the former album are deleted. Copied properties include those that relate directly to the particular album property, and deleted properties include those that identify a specific track. For example, although changing the album property of a media file 402 doesn't uniquely identify the track in the new album, it does identify the fact that track-specific properties referenced by the media file 402 (as belonging to the old album) are no longer valid, and, thus, should be deleted. In this case, the following properties are copied from the drop target (i.e., album property node) to the metadata of the drag source (i.e., media file): Collection ID, Collection Group ID, Album Title, Album Artist, Provider Style, Provider Rating, Buy URL, Large Album Art URL, Small Album Art URL, More Info URL, Provider Name, Provider URL, and Provider Logo URL. The following properties are deleted from the drag source: Unique File Identifiers, Release Time, and Content ID or Track ID.

Alternatively, a menu can provide the user the ability to select a track 402 to edit. For example, a context menu similar to the context menu shown in FIG. 3A, may be displayed in the graphical user interface after the user selects a track 402, and provides the user the option to identify a particular property node defining a property to use for replacing an existing property of the selected track 402.

Figure 4B:
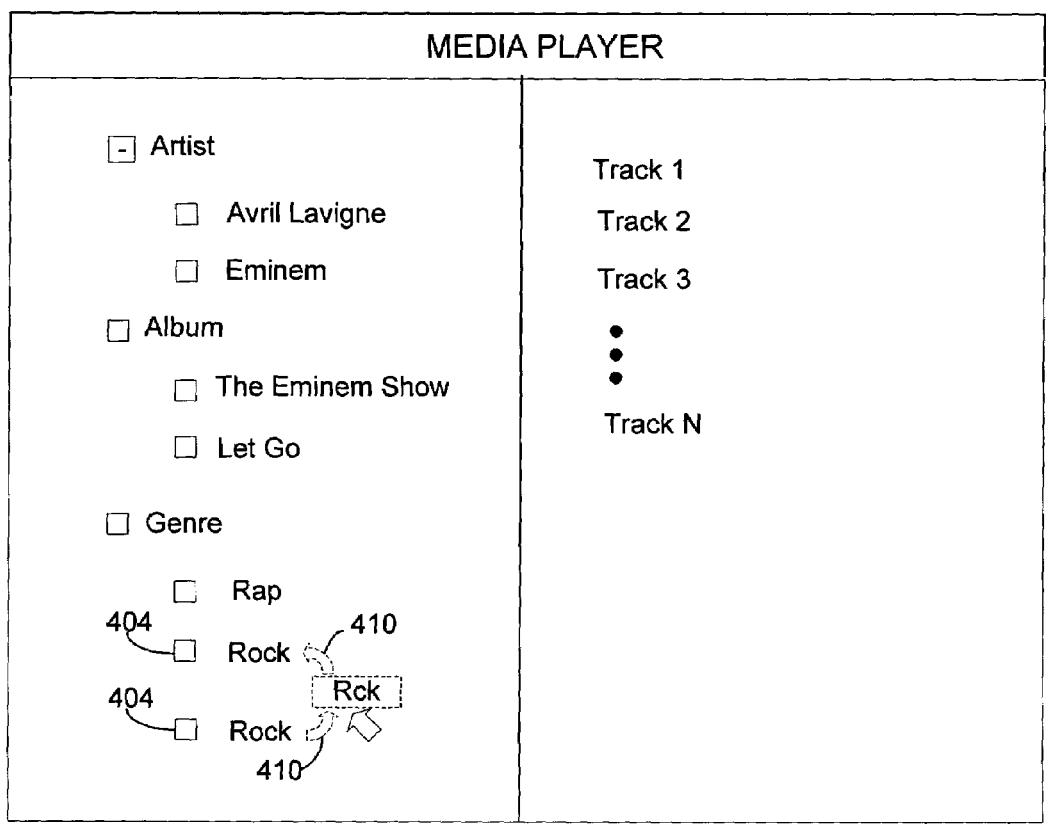
FIG. 4B is an exemplary user interface illustrating a drag and drop operation for editing a group of media files according to one embodiment of the invention.

Referring now to FIG. 4B, an exemplary user interface 400 illustrates a drag and drop operation for editing a group of media files 402 according to the invention. The user selects a property node 404 that corresponds to a property shared by one or more files in the list of media files, and drags the selected property node to a different property node 404 that defines a different property the user would like to incorporate into the metadata of the one or more files that share the property defined by the selected property node. By dropping the selected property node 404 onto a different property node 404, as indicated by reference character 410, the media player application allows a user to modify existing property data within metadata fields 208 (see FIG. 2) of the one or more media files 402 sharing the property defined by the selected property node to correspond to the property defined by the different property node. In this instance, modifying existing properties within the metadata fields (see FIG. 2) of the one or more media files includes replacing an existing property in the metadata field of the one or more media files having the property defined by the selected property node with the different property defined by the different property node. Alternatively, modifying existing property data within the metadata fields (see FIG. 2) of the one or more media files includes supplementing an existing property of the one or more media files having the property defined by the selected property node with the different property defined by the different property node. As a result, the invention allows the user to quickly and efficiently correct misspellings. For instance, if both "Rock" and "Rck" exist, the user can quickly drag 'Rck' to 'Rock' to repair misspelling without even looking up the files for which the problem exists. As another example, the user may want to modify the metadata of all media files currently indicating a genre of "Rap" to also indicate a genre of "Rock." Whether the one or more files in the list of media files having the property defined by the selected property node are changed and/or supplemented can depend on the property node onto which the selected property node is dropped.

In another embodiment, dropping a selected property node 404 onto a different property node 404 allows the user the option via a context or popup menu (see FIG. 3A) to change or supplement the metadata of all media files having the property defined by the selected property node. In this instance, supplementing includes adding the different property defined by the different property node 404, upon which the selected property node 404 is dropped, to the metadata of the media files having the property defined by the selected property node. Changing includes replacing an existing property of the one or more media files having the property defined by the selected property node 404 with the different property defined by the different property node 404 upon which the selected property node is dropped. For example, when a selected genre property node is dropped onto a different genre property node, the media player application allows the user to replace or supplement all media files having the genre defined by the selected genre property node with the genre defined by the different genre property node. Dropping a selected artist property node onto a genre property node allows the user to replace or supplement the genre of all tracks by the artist defined by the selected artist node with the genre defined by the genre property node. Dropping a selected album property node onto a genre property node allows the user to change or supplement the genre of all tracks for the album defined by album property node to correspond to the genre defined by the genre property node.

In another embodiment, dropping a particular property node onto a different property node automatically replaces an existing property of all media files having the property defined by the particular property node with the property defined by the different property node. For example, when a selected artist property node is dropped onto a different artist property node, the media player application replaces the artist property of all tracks having the artist property defined by the selected artist property node with the different artist defined by the different artist property. As a further example, dropping a selected album property node onto an artist property node automatically replaces the artist property for all tracks on the specific album defined by the selected album property node with the artist property defined by the artist property node.

In yet another embodiment, dropping a selected property node onto a different property node automatically adds tracks having the property defined by the selected property node to tracks having the property defined by the defined property node. For instance, when a selected album property node is dropped onto a different album property node, the media player application adds all tracks of the album defined by the selected album property node (source album) to the album defined by the different property node (target album). For each track in the source album, additional properties such as described above in reference to FIG. 4A, are copied and deleted. For example, properties that are unique to each of the tracks being added to the tracks of the target album will be copied, and properties that are unique to the source album will be deleted from the tracks being added to the tracks of the target album.

Alternatively, a menu can provide the user the ability to edit a property shared by a group of media files 402. For example, a context menu similar to the context menu 318 shown in FIG. 3A, may be displayed in the graphical user interface after the user selects a property node that corresponds to a property shared by one or more files in the list of media files, and provides the user the option to identify a different particular property node defining a different property to use for replacing an existing property of all media files having the property defined by the selected property node.

Referring now to FIG. 5, an exemplary flow chart illustrates a method of editing a media file according to one embodiment of the invention. A user selects a media file from a list of media files being displayed on a graphical user interface at 502. At 504, using navigation techniques such as described above, the user drags the selected media file to a property node and drops the selected media file. The property node defines a metadata property within a metadata category such as genre, artist or album. At 506, the media application determines whether the property node defines an album property If the property node defines an album property, the media player application adds the selected media file to the album defined by the property node at 508. If the property node does not define an album property, the media application determines whether the property node defines a genre property at 510. At 512, if the property node defines a genre property, the user is provided an option to change or supplement existing property data within the selected media file. If the user elects to change existing category property data, the media player application replaces an existing property of the media file with the property defined by the property node at 514. If the user elects to supplement existing property data, the media player application adds the property defined by the property node to existing property data within the selected media file at 516. Alternatively, if the property node does not define a genre property, the media player application automatically replaces an existing property (e.g., album property or artist property) with the property defined by the property node at 518.

Referring now to FIG. 6, an exemplary flow chart illustrates a method of editing a group of media files according to one embodiment of the invention. A user selects a first property node being displayed via graphical user interface at 602. At 604, the user, using navigation techniques such as described above, drags the first property node to a second property node and drops the selected first property node. The first property node and second property node each define a metadata property within a metadata category such as genre, artist, or album title. The media application determines whether the first and second property nodes define album properties at 606. If the media application determines that the first and second property nodes define album properties, the media player application adds all the media files (e.g., tracks) of the album defined by the first node to the album defined by the second node at 608. If the media application determines that the first and second property nodes do not both define album properties, the media application determines whether the second property node defines a genre property at 610. At 612, if the second property node defines a genre property, the user is provided an option to change or supplement existing category property data of all media files having the property defined by the first node. If the user elects to change existing category property data, the media player application changes the existing genre property of all media files having the property defined by the first node to the genre property defined by the second property node at 614. If the user elects to supplement existing property data, the media player application adds the genre property defined by the second property node to the existing property data of all media files having the property defined by the first node at 616. Alternatively, if the second property node does not define a genre property, the media player application automatically replaces an existing category property (e.g., album property or artist property) of all media files having the property define by the first node with the property defined by the second property node at 618.

FIG. 7 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer-readable media. Computer-readable media, which include both volatile and nonvolatile media, removable and non-removable media, may be any available medium that can be accessed by computer 130. By way of example and not limitation, computer-readable media comprise computer storage media and communication media. Computer storage media include volatile and nonvolatile, removable and non-removable media implemented in any method or technology for storage of information such as computer-readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 130. Communication media typically embody computer-readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer-readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 7 illustrates operating system 144, application programs 146, other program modules 148, and program data 150.

The computer 130 may also include other removable/non-removable, volatile/nonvolatile computer storage media. For example, FIG. 7 illustrates a hard disk drive 154 that reads from or writes to non-removable, nonvolatile magnetic media. FIG. 7 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 7, provide storage of computer-readable instructions, data structures, program modules and other data for the computer 130. In FIG. 7, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 7 include a local area network (LAN) 196 and a wide area network (WAN) 198, but may also include other networks. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 7 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

In operation, computer 130 executes computer-executable instructions such as those illustrated in FIG. 5 and FIG. 6 to modify metadata of one or more a media files in a media library.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the constructions and methods without departing from the scope of the invention, it is intended that all matter contained in the above description and shown in the accompanying drawings shall be interpreted as illustrative and not in a limiting sense.

What is claimed is:

1. A method for modifying metadata of a media file in a media library, said media file having a metadata field that includes property data, and wherein the property data defines a property of the media file, comprising:

receiving a selection of a media file from a list of media files being displayed via a graphical user interface;

receiving a request including property category data associating the selected media file with a property category, said property category data defining a different property from the property data of the media file, said property category data including either genre property data, artist property data, or album property data, said request for associating comprises dragging and dropping;

associating the selected media file with the property category data within the property category;

in response to the associating, determining whether the property category data is the album property data;

if it is determined the property category data is the album property data, the selected media file is added to the property category associated with the album category data;

if it is determined the property category data is the genre category data and not the album property data;

providing dynamic options to a user for modifying or supplementing the property data of the selected media file, said dynamic options for modifying or supplementing being provided as a function of and depending upon the determined property category data and the defined property data of the selected media file;

receiving a user response to the provided options;

modifying or supplementing the metadata field of the selected media file to the different property defined by the property category data in response to the user response, wherein the property data of the selected media file is replaced with the genre category data if the user selects the modifying option or the property data of the selected media file is added with the genre category data if the user selects the supplementing option; and if it is determined that the property category data is not the album property data and not the genre property data, automatically replacing the property data of the selected media file with the album property data.

2. The method of claim 1, wherein receiving the selection of the media file includes receiving the selection via selecting and dragging the media file from a first location within the graphical user interface, and wherein the associating the selected media file with property category data includes dropping the selected and dragged media file onto the defined one or more property categories with property category data at a second location within in the graphical user interface.

3. The method of claim 1, wherein receiving the selection of the media file includes receiving the selection of the media file via a context menu displayed in graphical user interface, and wherein the associating the selected media file with property category data includes identifying the property category data via the context menu displayed in the graphical user interface.

4. The method of claim 1, wherein modifying includes:
replacing the property defined in the metadata field of the selected media file with the different property defined by the property category data; or
adding the different property defined by the property category data to the property data in the metadata field of the selected media file.

5. The method of claim 1, wherein the metadata field of the selected media file defines a genre property, an artist property, or an album title property.

6. The method of claim 5, wherein the selected media file includes a plurality of metadata fields, and wherein modifying includes modifying a property defined in one or more of the metadata fields.

7. The method of claim 6, wherein modifying includes changing the property defined in each of the one or more metadata fields of the selected media file to include a new property when the different property defined by the property category data is an album title property, and wherein the one or more metadata fields of the selected media file define one or more of the following properties:
a collection ID property;
a collection group ID property
an album Artist property;
a provider Style property;
a provider Rating property;
a buy URL property;
a large Album Art URL property;
a small Album Art URL property;
a more Info URL property;
a provider Name property;
a provider URL property; and
a provider Logo URL property.

8. The method of claim 7, wherein modifying further includes deleting a property defined in each of the one or more of the metadata fields of the selected media file when the different property defined by the property category data is an album title property, and wherein the one or more metadata fields define one or more of the following properties:
a unique file identifier property;
a release time property; and
a content ID property.

9. A method for modifying metadata of one or more media files in a media library, said one or more media files each having a metadata field that includes property data, and wherein the property data defines a property of the media file, comprising:
selecting property category data within a property category being displayed via graphical user interface corresponding to an instruction from a user, wherein the property category data defines a property of the one or more media files;
associating the selected property category data with different property category data, said associating corresponding to another instruction from the user, said another instruction comprising dragging the selected property category data and dropping the selected property category data to a location on the display of the different property category data, wherein the different property category data defines a different property than the property of the media file;
in response to the associating, providing dynamic options to the user for modifying or supplementing the selected property category data of the media file, said dynamic options for modifying or supplementing being provided as a function of and based upon the selected property category data and the different property category data;
receiving a user response to the provided options; and
modifying or supplementing the property data in the metadata field of the one or more media files having the property defined by the property category data to the different property defined by the different property category data in response to the user response.

10. The method of claim 9, wherein the selecting includes selecting and dragging the property category data from a first location within the graphical user interface, and wherein the associating includes dropping the selected and dragged property category data onto the different property category data at a second location in the graphical user interface.

11. The method of claim 9, wherein the selecting includes selecting property category data via a context menu displayed in the graphical user interface, and wherein the associating the selected media file with property category data includes identifying the different property category data via the context menu displayed in the graphical user interface.

12. The method of claim 9, wherein modifying includes:
changing the property data in the metadata field of the one or more media files having the property defined by the selected property category data to the different property defined by the different property category data; or
changing the metadata field of the one or more media files having the property defined by the selected property category data to include the different property defined by the different property category data.

13. The method of claim 9, wherein the metadata field of the one or more media files defines a genre property, an artist property, or an album title property.

14. The method of claim 13, wherein the selected property category data defines a first genre property and the different property category data defines a second genre property, and wherein modifying includes:
changing property data in the metadata field of the one or more media file shaving the first genre property from the first genre property to the second genre property; or
changing property data in the metadata field of the one or more media files having the first genre property to include the first genre property and the second genre property.

15. The method of claim 13, wherein the selected property category data defines an artist property and the different property category data defines a genre property, and wherein modifying includes:
changing property data in the metadata field of the one or more media file having the defined artist property from an existing genre property to the genre property defined by the different property category data; or changing the property data in the metadata field of the one or more media files having the defined artist property to include the existing genre property and the genre property defined by the different property category data.

16. The method of claim 13, wherein the selected property category data defines an album property and the different property category data defines a genre property, and wherein modifying includes:
changing property data in the metadata field of the one or more media files having the defined album property from an existing genre property to the genre property defined by the different property category data; or
changing the property data in the metadata field of the one or more media files having the defined album property to include the existing genre property and the genre property defined by the different property category data.

17. The method of claim 13, wherein the selected property category data defines a first artist property and the different property category data defines a second artist property, and wherein modifying includes changing property data in the metadata field of the one or more media files having the first artist property from the first artist property to the second artist property.

18. The method of claim 13 wherein the selected property category data defines an album property and the different property category data defines an artist property, and wherein modifying includes changing property data in the metadata field of the one or more media files having the defined album property from an existing artist property to the artist property defined by the different property category data.

19. The method of claim 13, wherein the property category data defines a first album property and the different property category data defines a second album property, and wherein modifying includes changing property data in the metadata field of the one or more media files having the first album property from the first album property to the second album property.

20. The method of claim 19, wherein each of the media files having the first album property include a plurality of metadata fields, and wherein modifying includes modifying a property defined in one or more of the metadata fields.

21. The method of claim 20, wherein modifying includes changing the property defined in each of the one or more metadata fields of the media files having the first album property to include a new property when the different property defined by the different property category data is an album title property, and wherein the one or more metadata fields of the media files having the first album property define one or more of the following properties:
a collection ID property;
a collection group ID property
an album Artist property;
a provider Style property;
a provider Rating property;
a buy URL property;
a large Album Art URL property;
a small Album Art URL property;
a more Info URL property;
a provider Name property;
a provider URL property; and
a provider Logo URL property.

22. The method of claim 21, wherein modifying further includes deleting a property defined in each of the one or more of the metadata fields of the media files having the first album property when the different property defined by the property category data is an album title property, and wherein the one or more metadata fields of the media files having the first album property define one or more of the following properties:
a unique file identifier property;
a release time property; and
a content ID property.

23. A computer-readable storage medium having computer executable instructions for modifying metadata of a media file in a media library, said media file having a metadata field that includes property data, and wherein the property data defines a property of the media file, comprising:
identifying instructions for identifying a media file from a list of media files being displayed via a graphical user interface;
associating instructions for associating the identified media file with property category data within a property category, wherein the property category data defines a different property than the property of the media file;
in response to the associating, displaying instructions for providing dynamic options to the user for modifying or supplementing the property data included in the metadata field of the media file, said dynamic options for modifying or supplementing being provided as a function of and based upon the defined property of the media file and the property category data;
receiving instructions for receiving a user response to the provided options; and
modifying or supplementing instructions for modifying the metadata field of the identified media file to the different property defined by the property category data in response to the user response.

24. The computer-readable storage medium of claim 23, wherein the identifying instructions includes instructions for identifying the media file from a media file being dragged by a user from a first location in the graphical user interface, and wherein the associating instruction includes instructions for associating the dragged media file with property data at a second location in the graphical user interface onto which the dragged media file is dropped.

25. The computer-readable storage medium of claim 23, wherein the identifying instructions includes instructions for identifying the media file from a media file being selected from a context menu displayed in the graphical user interface, and wherein the associating instruction includes instructions for associating the selected media file with property category data identified via the context menu displayed in the graphical user interface.

26. The computer-readable storage medium of claim 23, wherein the modifying instructions includes instructions for:
replacing the property defined in the metadata field of the identified media file with the different property defined by the property category data; or
adding the different property defined by the property category data to the property data in the metadata field of the selected media file.

27. The computer-readable storage medium of claim 23, wherein the metadata field of the identified media file defines a genre property, an artist property, or an album title property.

28. The computer-readable storage medium of claim 27, wherein the identified media file includes a plurality of metadata fields, and wherein the modifying instructions modify a property defined in one or more of the metadata fields.

29. The computer-readable storage medium of claim 28, wherein the modifying instructions includes instructions for changing the property defined in each of the one or more metadata fields of the identified media file to include a new property when the different property defined by the property category data is an album title property, and wherein the one or more metadata fields of the identified media file define one or more of the following properties:
- a collection ID property;
- a collection group ID property
- an album Artist property;
- a provider Style property;
- a provider Rating property;
- a buy URL property;
- a large Album Art URL property;
- a small Album Art URL property;
- a more Info URL property;
- a provider Name property;
- a provider URL property; and
- a provider Logo URL property.

30. The computer-readable storage medium of claim 29, wherein the modifying instructions includes instructions for deleting a property defined in each of the one or more of the metadata fields of the selected media file when the different property defined by the property category data is an album title property, and wherein the one or more metadata fields define one or more of the following properties:
- a unique file identifier property;
- a release time property; and
- a content ID property.

31. A computer-readable storage medium having computer executable instructions for modifying metadata of one or more media files in a media library, said one or more media files each having a metadata field that includes property data, and wherein the property data defines a property of the media file, comprising:
   identifying instructions for identifying property category data within a property category being displayed via graphical user interface, wherein the property category data defines a property of one or more media files to be modified;
   associating instructions for associating the identified property category data with different property category data, wherein the different property category data defines a different property;
   in response to the associating, displaying instructions for providing dynamic options to the user for modifying or supplementing the identified property category data of the media file, said dynamic options for modifying or supplementing being provided as a function of the identified property category data and the different property category data;
   receiving instructions for receiving a user response to the provided options; and
   modifying instructions for modifying or supplementing the property data in the metadata field of the one or more media files having the property defined by the property category data to the different property defined by the different property category data in response to the user response.

32. The computer-readable storage medium of claim 31, wherein identifying instructions includes instructions for identifying the property category data from property category data being dragged by a user from a first location in the graphical user interface, and wherein associating instructions includes instructions for associating the dragged property category data with different property data at a second location in the graphical user interface onto which the dragged property category data is dropped.

33. The computer-readable storage medium of claim 31, wherein the identifying instructions includes instructions for identifying the property category data from property category data being selected from a context menu displayed in the graphical user interface, and wherein the associating instruction includes instructions for associating the identified the property category data with different property category data identified via the context menu displayed in the graphical user interface.

34. The computer-readable storage medium of claim 31, wherein the modifying instructions includes instructions for:
   changing the property data in the metadata field of the one or more media files having the property defined by the identified property category data to the different property defined by the different property category data; or
   changing the metadata field of the one or more media files having the property defined by the identified property category data to include the different property defined by the different property category data.

35. The computer-readable storage medium of claim 31, wherein the metadata field of the one or more media files defines a genre property, an artist property, or an album title property.

36. The computer-readable storage medium of claim 35, wherein the identified property category data defines a first genre property and the different property category data defines a second genre property, and wherein modifying instructions includes instructions for:
   changing property data in the metadata field of the one or more media files having the first genre property from the first genre property to the second genre property; or
   changing property data in the metadata field of the one or more media files having the first genre property to include the first genre property and the second genre property.

37. The computer-readable storage medium of claim 35, wherein the identified property category data defines an artist property and the different property category data defines a genre property, and wherein the modifying instructions includes instructions for:
   changing property data in the metadata field of the one or more media files having the defined artist property from an existing genre property to the genre property defined by the different property category data; or
   changing the property data in the metadata field of the one or more media files having the defined artist property to include the existing genre property and the genre property defined by the different property category data.

38. The computer-readable storage medium of claim 35, wherein the identified property category data defines an album property and the different property category data defines a genre property, and wherein the modifying instructions includes instructions for:
   changing property data in the metadata field of the one or more media files having the defined album property from an existing genre property to the genre property defined by the different property category data; or
   changing the property data in the metadata field of the one or more media files having the defined album property to include the existing genre property and the genre property defined by the different property category data.

39. The computer-readable storage medium of claim 35, wherein the identified property category data defines a first artist property and the different property category data defines a second artist property, and wherein the modifying instructions includes instructions for changing property data in the metadata field of the one or more media files having the first artist property from the first artist property to the second artist property.

40. The computer-readable storage medium of claim 35, wherein the identified property category data defines an album property and the different property category data defines an artist property, and wherein the modifying instructions includes instructions for changing property data in the metadata field of the one or more media files having the defined album property from an existing artist property to the artist property defined by the different property category data.

41. The computer-readable storage medium of claim 35, wherein the property category data defines a first album property and the different property category data defines a second album property, and wherein the modifying instructions includes instructions for changing property data in the metadata field of the one or more media files having the first album property from the first album property to the second album property.

42. The computer-readable storage medium of claim 41, wherein each of the media files having the first album property include a plurality of metadata fields, and wherein the modifying instructions modify a property defined in one or more of the metadata fields.

43. The computer-readable storage medium of claim 42, wherein the modifying instructions includes instructions for changing the property defined in each of the one or more metadata fields of the media files having the first album property to include a new property when the different property defined by the different property category data is an album title property, and wherein the one or more metadata fields of the media files having the first album property define one or more of the following properties:
   a collection ID property;
   a collection group ID property
   an album Artist property;
   a provider Style property;
   a provider Rating property;
   a buy URL property;
   a large Album Art URL property;
   a small Album Art URL property;
   a more Info URL property;
   a provider Name property;
   a provider URL property; and
   a provider Logo URL property.

44. The computer-readable storage medium of claim 43, wherein the modifying instructions further includes instructions for deleting a property defined in each of the one or more of the metadata fields of the media files having the first album property when the different property defined by the property category data is an album title property, and wherein the one or more metadata fields of the media files having the first album property define one or more of the following properties:
   a unique file identifier property;
   a release time property; and
   a content ID property.

45. In a computer system for modifying the metadata of a media file, said system having a graphical user interface including a display and a user interface selection device, a method of providing and selecting from a list of media files on the display, comprising:
   selecting a media file from the list of media files being displayed by the user interface, said media file having a metadata field defining a property of the media file;
   associating the selected media file with property category data within a property category being displayed by the user interface, wherein the property category data defines a different property than the property of the media file;
   wherein the computer system is responsive to associating the selected media file with property category data by providing dynamic options to a user for modifying or supplementing the property of the selected media file, said dynamic options for modifying or supplementing being provided as a function of and based upon the property of the media file and the property category data;
   receiving a user response to the provided options; and
   wherein the computer system is responsive to the received user response to modify the metadata field of the selected media file to the different property defined by the property category data.

46. The method of claim 45, wherein selecting the media file includes selecting and dragging the media file from a first location in the display, and wherein associating includes dropping the selected and dragged media file onto the property category data at a second location in the media library.

47. The method of claim 45, wherein the list of media files are displayed in a media file data section, and wherein the property category data is displayed in an indexing section.

48. In a computer system for modifying the metadata of a group of media files, said system having a graphical user interface including a display and a user interface selection device, a method of providing and selecting from property category data on the display, comprising:
   selecting property category data within a property category being displayed by the user interface, wherein the property category data defines a property of one or more media files, and wherein each of the one or more media files includes a metadata field defining a property of the media file;
   associating the selected property category data with different property category data within a property category being displayed by the user interface, wherein the different property category data defines a different property of one or more media files;
   wherein the computer system is responsive to associating the selected property category data with the different property category data by providing dynamic options to a user for modifying or supplementing the selected property category data included in the metadata field of the media file, said dynamic options for modifying or supplementing being provided as a function of and based upon the selected property category data and the different property category data;
   receiving a user response to the provided options; and
   wherein the computer system is responsive to the received user response to modify or supplement the metadata field of the one or more media files having the property defined by the selected property category data to the different property.

49. The method of claim 48, wherein selecting property category data includes selecting and dragging the property category data from a first location in the display, and wherein associating the selected property category data with the different property category data includes dropping the selected and dragged property category data onto the different property category data at a second location in the media library.

50. The method of claim 48, wherein the selected property category data and the different property category data are displayed in an indexing section.

* * * * *